United States Patent [19]

Flaugher et al.

[11] Patent Number: 5,685,087

[45] Date of Patent: Nov. 11, 1997

[54] FLUID FLOW ADSORBENT CONTAINER

[75] Inventors: David Flaugher, Beavercreek; Douglas E. LeConey, Clayton; Glenn Perrine, Eaton; Raymond B. Wood, Brookville, all of Ohio

[73] Assignee: Stanhope Products Company, Brookville, Ohio

[21] Appl. No.: 525,382

[22] Filed: Sep. 8, 1995

[51] Int. Cl.[6] .................................................. F26B 21/06
[52] U.S. Cl. .......................... 34/80; 34/95; 34/205; 34/299; 220/676; 210/288
[58] Field of Search ........................... 34/95, 80, 205, 34/209, 299, 472; 210/288, 289; 220/676

[56] References Cited

U.S. PATENT DOCUMENTS

| | | | |
|---|---|---|---|
| 558,840 | 4/1896 | Purves | 34/80 |
| 894,973 | 8/1908 | Morgan | 34/80 |
| 1,425,197 | 8/1922 | Hamlin | 34/80 |
| 1,439,151 | 12/1922 | Dailey et al. | |
| 1,776,558 | 9/1930 | Herman | |
| 2,148,770 | 2/1939 | Mittendorf | 210/131 |
| 2,181,511 | 11/1939 | Domoto | 220/20 |
| 2,325,657 | 8/1943 | Burkness | 210/131 |
| 2,334,840 | 11/1943 | Punton et al. | 183/44 |
| 2,482,779 | 9/1949 | Katz | 126/263 |
| 2,600,435 | 6/1952 | Shapiro | 210/131 |
| 2,626,678 | 1/1953 | Yant | 183/44 |
| 2,661,870 | 12/1953 | Huenergardt | 222/129 |
| 2,761,527 | 9/1956 | Dreznes | 183/44 |
| 3,221,478 | 12/1965 | Norton | 55/281 |
| 3,469,696 | 9/1969 | Petrucci et al. | 210/97 |
| 3,545,227 | 12/1970 | Grahl | 62/474 |
| 3,746,174 | 7/1973 | Watanabe | 210/282 |
| 3,796,025 | 3/1974 | Kasten | 55/316 |
| 3,799,352 | 3/1974 | McClive | 210/282 |
| 3,879,292 | 4/1975 | McClive | 210/282 |
| 3,918,578 | 11/1975 | Cullen et al. | 206/204 |
| 3,926,599 | 12/1975 | Rudin et al. | 55/387 |
| 3,961,919 | 6/1976 | Lamoreaux | 55/184 |
| 4,029,486 | 6/1977 | Frantz | 55/218 |
| 4,116,649 | 9/1978 | Cullen et al. | 55/387 |
| 4,266,408 | 5/1981 | Krause | 62/474 |
| 4,401,447 | 8/1983 | Huber | 55/387 |
| 4,405,347 | 9/1983 | Cullen et al. | 55/387 |
| 4,436,623 | 3/1984 | Cullen et al. | 210/282 |
| 4,457,843 | 7/1984 | Cullen et al. | 210/282 |
| 4,458,624 | 7/1984 | Waller | 55/274 |
| 4,464,186 | 8/1984 | Mann | 55/387 |
| 4,464,261 | 8/1984 | Cullen et al. | 210/282 |
| 4,474,035 | 10/1984 | Amin et al. | 62/503 |
| 4,573,632 | 3/1986 | Scheeren | 229/2.5 R |
| 4,619,673 | 10/1986 | Cullen et al. | 55/387 |
| 4,623,368 | 11/1986 | Lancesseur | 55/387 |
| 4,683,057 | 7/1987 | Krause et al. | 210/232 |
| 4,698,164 | 10/1987 | Ellis | 210/739 |
| 4,764,274 | 8/1988 | Miller | 210/232 |
| 4,800,018 | 1/1989 | Moser | 210/266 |
| 4,882,052 | 11/1989 | Peranio | 210/282 |
| 4,911,739 | 3/1990 | Cullen et al. | 55/387 |
| 4,921,512 | 5/1990 | Maryyanek et al. | 55/488 |
| 4,994,185 | 2/1991 | Cullen et al. | 210/282 |
| 5,036,972 | 8/1991 | Cullen et al. | 206/204 |

(List continued on next page.)

*Primary Examiner*—Henry A. Bennett
*Assistant Examiner*—Dinnatia Doster
*Attorney, Agent, or Firm*—Biebel & French

[57] ABSTRACT

A container is provided for housing desiccant material therein and for facilitating fluid flow therethrough to a surrounding environment. The container comprises a cup member including a base or bottom wall member and a generally cylindrically shaped outer wall connected to the base or bottom wall member to thereby define a housing. A plurality of openings extend through the outer wall and provide communication between the housing and the surrounding environment. At least one recessed, relief portion is provided in communication with one of the openings. The recessed, relief portion has an outer diameter dimension less than the outer diameter dimension of the cup member. Accordingly, when the cup is snugly received in an associated canister or the like, a relief area is formed that defines a fluid flow channel along the interface of the cup member and canister.

8 Claims, 5 Drawing Sheets

U.S. PATENT DOCUMENTS

| | | | |
|---|---|---|---|
| 5,038,582 | 8/1991 | Takamatsu | 62/474 |
| 5,119,616 | 6/1992 | Cullen et al. | 53/453 |
| 5,177,982 | 1/1993 | Plemens | 62/503 |
| 5,184,480 | 2/1993 | Kolpacke | 62/503 |
| 5,288,469 | 2/1994 | Skalla | 422/171 |
| 5,289,697 | 3/1994 | Hutchison | 62/474 |
| 5,304,235 | 4/1994 | Watanabe et al. | 96/144 |
| 5,435,153 | 7/1995 | Hutchison et al. | 62/474 |
| 5,522,204 | 6/1996 | Wood | 53/452 |
| 5,529,203 | 6/1996 | Flaugher | 220/306 |
| 5,540,348 | 7/1996 | Wood | 220/306 |

FLUID FLOW ADSORBENT CONTAINER

FIELD OF THE INVENTION

This invention pertains to an adsorbent container for use in proximity drying processes such as those utilized in automobile air conditioner systems.

BACKGROUND OF THE INVENTION

Adsorbents, such as desiccants, are commonly used in automotive air conditioning systems for dehydrating air and refrigerants. Particulate desiccants are common in such systems because the high surface area-to-volume ratios of the particles facilitate the interaction of the particles with surrounding air or fluid. Since the particles of desiccant must be held in the air or fluid stream and prevented from contaminating other parts of the system, the particles must be held in a container which is permeable to the air or fluid but impermeable to the particles.

One form of dryer used in automotive air conditioning systems includes an elongated receiver or accumulator canister having inlet and outlet ports communicating with the interior of the canister. A desiccant container is positioned in the interior of the canister and allows for air and/or flow fluid through the desiccant material.

The desiccant material itself may be in the form of a powder or particulate material encased within a felt-like bag or enclosure. Examples of such bags and enclosures are described, for instance, in U.S. Pat. No. 4,474,035 (Amin et al.); U.S. Pat. No. 4,619,673 (Cullen et al.) and U.S. Pat. No. 5,177,982 (Plemens).

In another approach developed by the assignee of the present invention, a desiccant containing cup member is provided to house the particulate desiccant. The cup is of a one-piece molded plastic construction with the outside diameter fitting snugly within the receiver or accumulator canister. Openings along the top lid of the cup and along the cup bottom allow for fluid (e.g., air and refrigerant) flow through the cup and desiccant material for subsequent exit through an outlet port associated with the canister. A filter element such as a porous felt like material is superposed over the desiccant under the cup lid and, in similar fashion, the filter material also is disposed under the desiccant along the bottom of the cup.

Although the cup design as above described has provided significant advantage in the manufacture, and uniformity of the cup and in the reliable accurate reception of the cup in the canister, it is desired to improve upon this cup design to allow for a greater filter surface area and to minimize pressure drop through the cup.

SUMMARY OF THE INVENTION

Accordingly, the present invention is directed toward an improved adsorbent containing cup design which design not only provides for snug reception of the cup within its associated canister, but also provides for increased filter surface area while minimizing pressure drop.

The cup structure includes a plurality of axially extending slots that are disposed around the outer periphery or wall of the cup to provide communication between the cup interior and the outside. The slots are separated from each other by the provision of axially extending posts. To provide stability to the cup, transverse flute members are provided transverse to the cup axis and extend across the slots.

In one embodiment of the invention, the flutes and slots, together define a recessed, relief area having a cross sectional dimension (o.d.) that is less than the outside diameter of the cup. Accordingly, when received in the air conditioner system canister, fluid may flow into the canister through an open cap structure and then contact desiccant housed in the cup. Dried and filtered fluid flow radially exits the cup through the slots and travels along the inside diameter of the canister within the recessed relief area to the canister outlet port.

In another embodiment, the slots, flutes, and posts are all provided in a reduced diameter portion of the cup outer wall. This reduced diameter section provides spacing from the inner diameter of the receiver or accumulator canister wall. Fluid accordingly flows through the cup, radially outwardly through the slots and then along this spacing, ultimately to the canister outlet post.

The invention will now be further described in accordance with the appended drawings, detailed description and claims.

DETAILED DESCRIPTION OF THE PREFERRED EMBODIMENT

Figure 1:
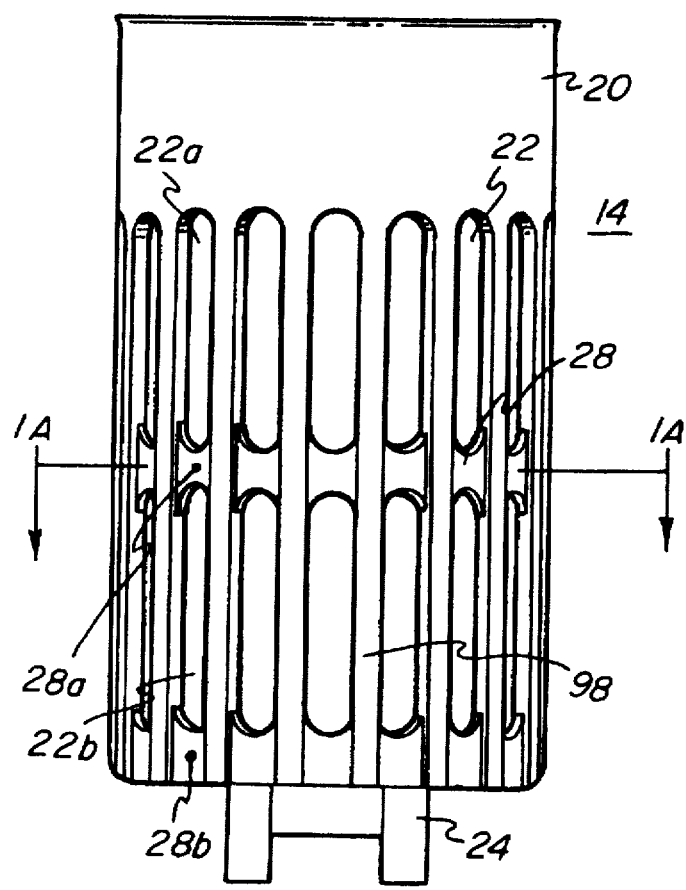
FIG. 1 is a side elevational view of one cup structure in accordance with the invention.

Turning first to FIG. 1 there is shown a first embodiment of an adsorbent cup 14 adapted for holding an adsorbent such as particulate desiccant therein. Cup 14 is a one-piece cylindrically shaped plastic molding which includes cylindrical outer wall 20. Equally spaced about the periphery of outer wall 20 are a plurality of slots 22 that provide communication between the interior of the cup and the outside atmosphere. As shown, the slots extend longitudinally, parallel to the axis of the generally cylindrical cup. The slots 22 are divided into an upper array 22a and lower array 22b by provision of transversely extending flutes 28. The flutes provide stability to the structure and, in some instances, provide protection to the desiccant and filter medium contained in the cup during welding of the canister into which the cup is received in an automotive air conditioning system and the like.

The flutes 28 are provided as an intermediate array 28a and bottom array 28b, the latter being disposed along the bottom or lower edge of outer wall 20. A plurality of longitudinally extending post members 98 are provided around the cup, with each post separating and disposed intermediate adjacent pairs of slots.

On the bottom of the cup a pedestal 24 is provided as an optional component to provide adequate clearance or spacing of the cup from the bottom of the air conditioning system canister.

Figure 1A:
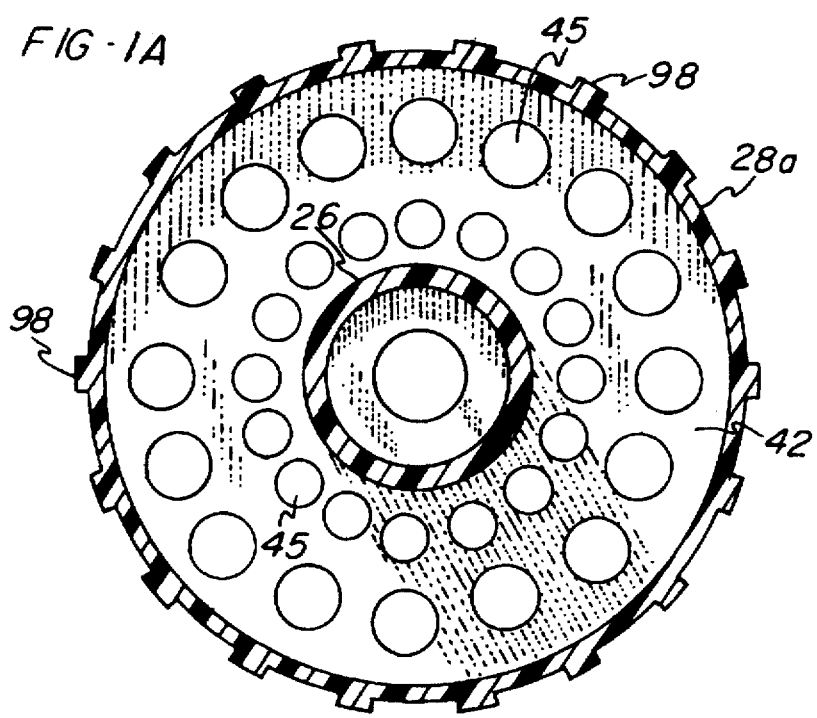
FIG. 1A is a transverse cross-sectional view of the cup of FIG. 1, taken along the lines and arrows 1A—1A in FIG. 1.

As can be seen most clearly in FIG. 1A, the posts 98 have an outside diameter that is greater than the outside diameter of the flutes 28 (flutes 28a shown in the figure). Accordingly, the slots and flutes together define a recessed relief area having a cross sectional dimension or outer diameter (o.d.) that is less than the o.d. of the posts. This recessed relief area will form a fluid flow channel as shall be more fully explained infra.

Also as shown in FIG. 1A, cup 14 is provided with an inner wall structure defining an inside tube 26 coaxial with the central axis of the cup. Tube 26 extends along the entire length of the cup and is adapted for reception of an inlet or outlet tube of an air conditioner system canister as shall be explained in more detail later. As shown, the bottom of cup 14 comprises a flat, annular base or bottom member 42 having a plurality of apertures 45 therein. Of course these apertures may be omitted, leaving a solid base if fluid flow requirements permit.

Figure 2:
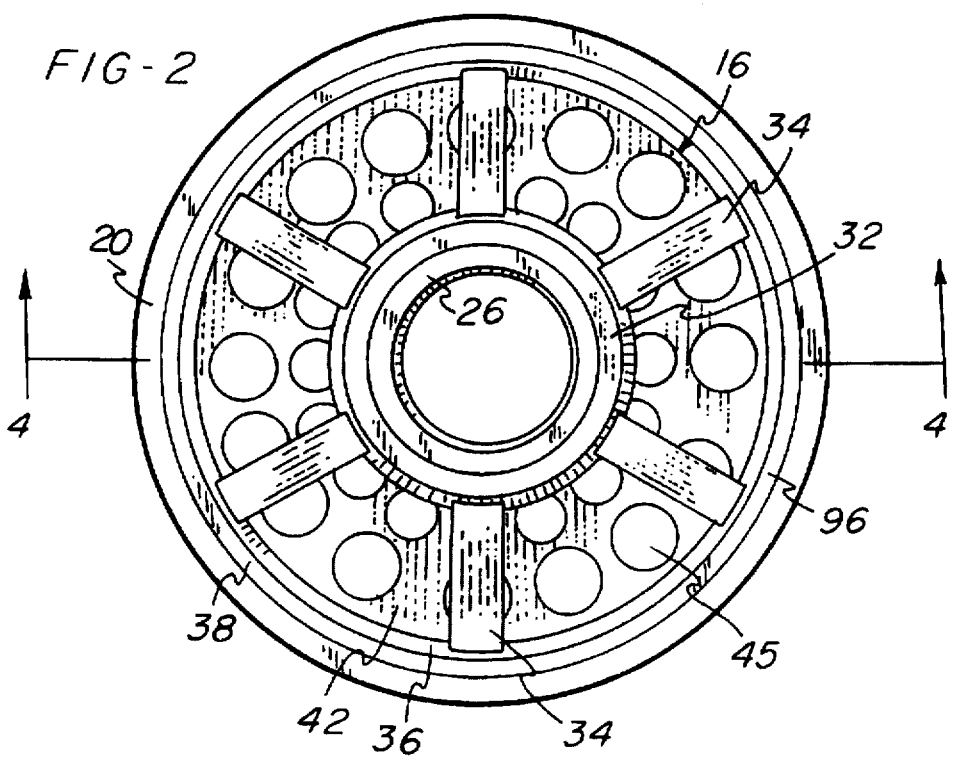
FIG. 2 is a top plan view of the cup shown in FIG. 1 shown with its associated cap in place.

Turning to FIG. 2 of the drawings, it can be seen that cap 16 comprises a central hub 32 coaxial with inner tube 26 of the cup and adapted for concentric reception around this inner tube 26. A plurality of radially oriented spokes 34 extend outwardly from hub 32 and connect hub 32 to outer rim 36. The outer rim 36 is dimensioned to provide for snug friction fit within the inside portion 38 of cup wall 20. Annular ribs 96 (only one of which is shown) may be provided around the inside portion 38 of wall 20 to provide for snap engagement of the cap 16 within the cup. It is apparent that the cap provides a mostly open top surface for fluid flow passage through the relatively large open spaces between the spokes 34. Other relatively open air structure caps can be provided.

Figure 3:
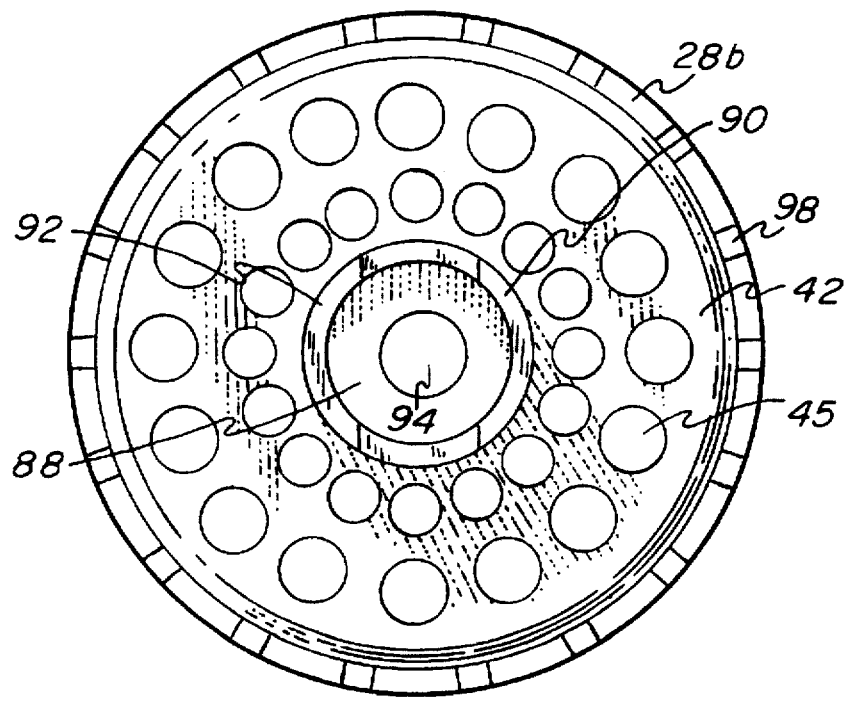
FIG. 3 is a bottom plan view of the cup shown in FIG. 1.

The bottom of the cup is best shown in FIG. 3 wherein annular bottom 42 with apertures 45 is detailed. Pedestal 24 comprises legs 92, 90 that extend from pedestal base 88.

Posts 98 extend around the periphery of the cylindrical cup, terminating in the top side of outer wall 20. A central aperture 94 communicates with the inner tube 26 (FIGS. 1A, and 2).

Figure 4:
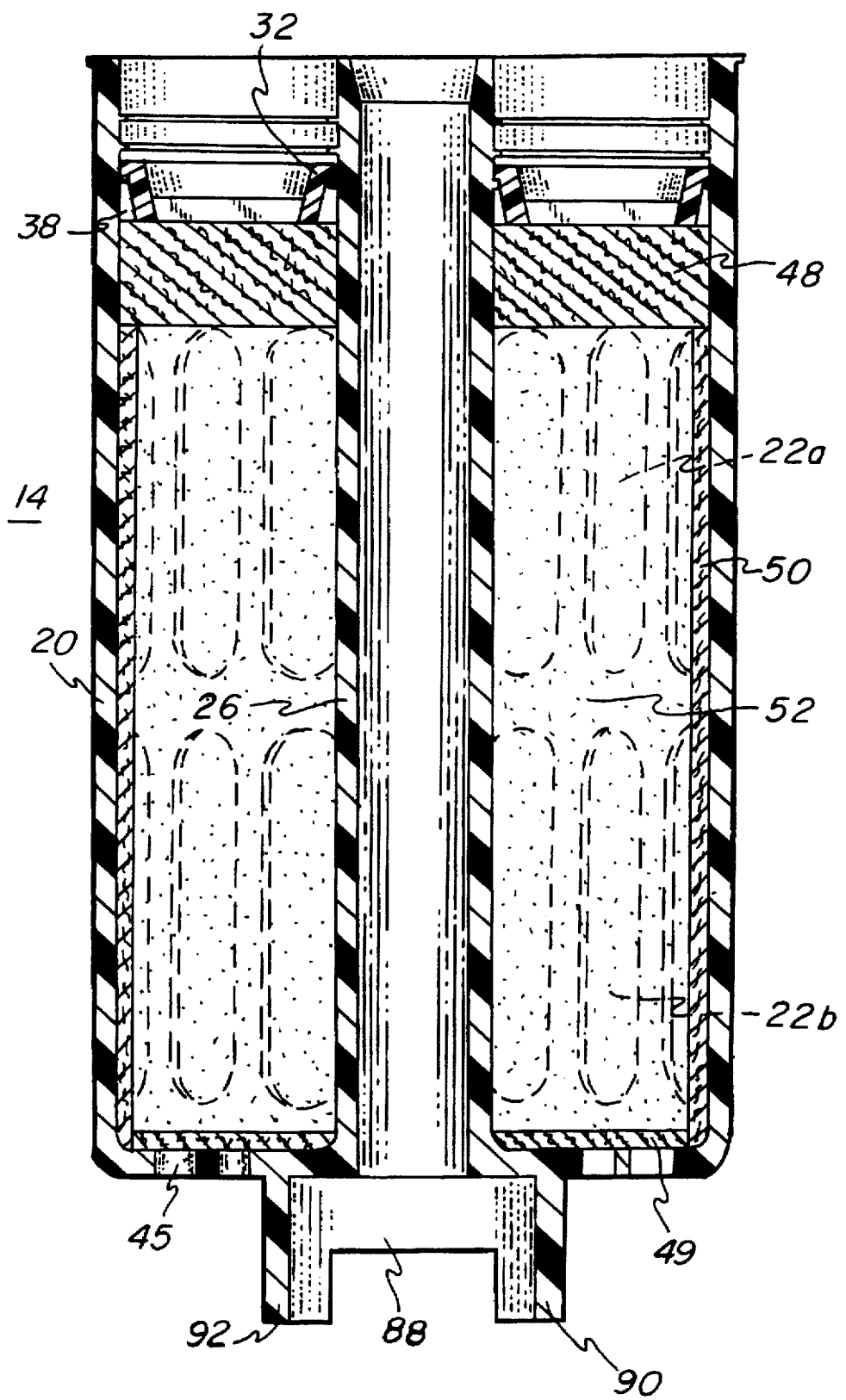
FIG. 4 is a longitudinal section view of the cup and cap combination taken along the lines and arrows 4—4 in FIG. 2.

As shown in the cross sectional view of FIG. 4, the cup is filled with an adsorbent such as particulate desiccant material 52. The top portion of the filled cup is lined with a filter medium 48 such as a felt or non-woven material. Similarly, the longitudinally extending sides of the cup are lined with filter medium 50 disposed in the form of a sleeve around the inner circumference of the outer wall 20. A bottom annularly shaped filter medium is provided and shown at 49. Slots 22a, b are shown in phantom in this figure.

It has been found that the combination of filter medium 48 in the form of an annulus based atop the particulate desiccant, the sleeve like disposition of filter medium 50 and filter medium 49 all provide an ample surface area allowing sufficient fluid flow through the cup structure and efficient filtering of contaminants from the fluid passing therethrough.

Figure 5:
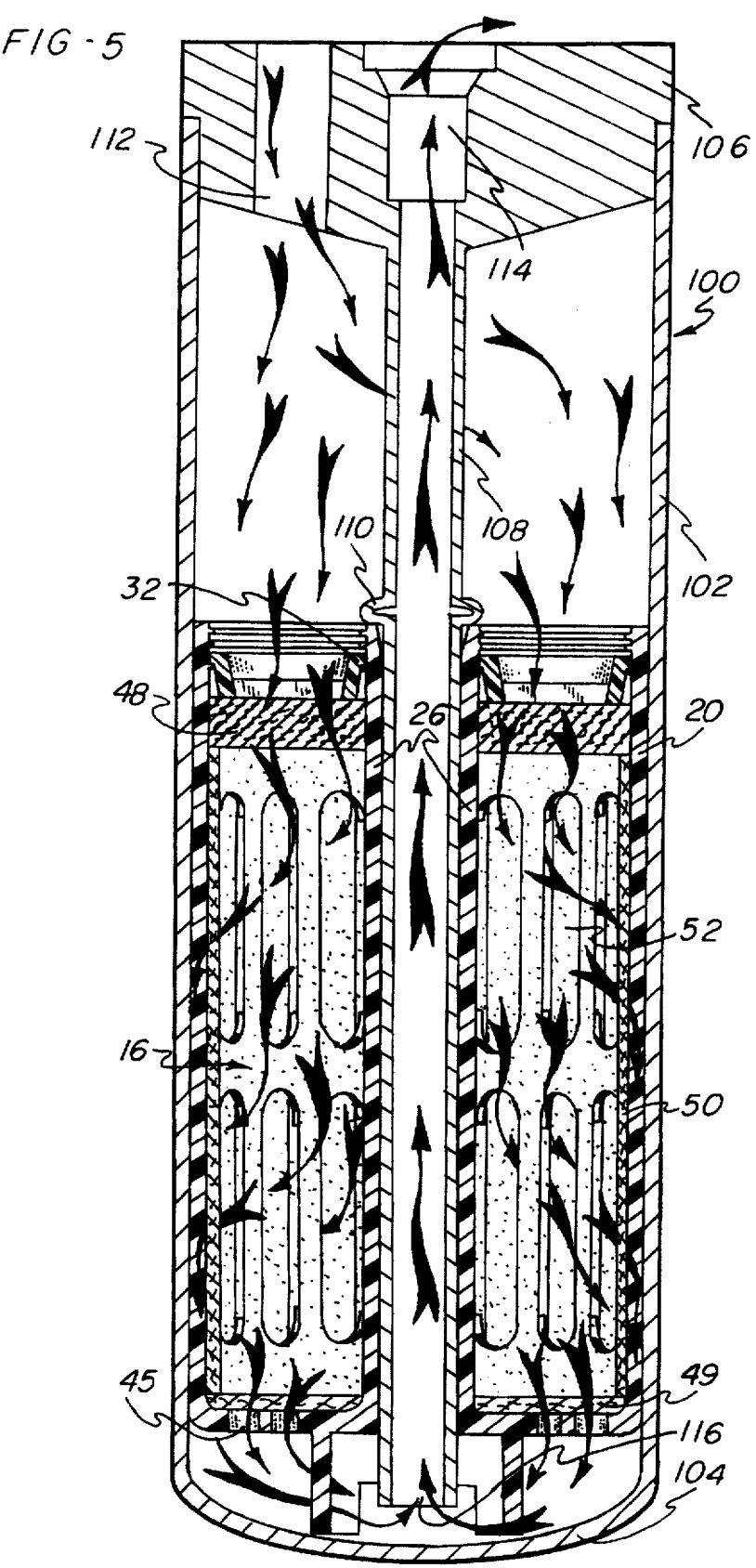
FIG. 5 is a longitudinal section view of the cup and cap similar to that of FIG. 4 but showing the cup and cap positioned in an associated canister.

FIG. 5 depicts the cup and cap combination of FIG. 1 as snugly received within canister 100 of a typical air conditioning system. Canister 100 comprises a generally cylindrical outer housing 102, the bottom of which terminates in base or bottom 104. Canister cap 106 is snugly received in the housing 102 and includes axial fluid flow tube 108 depending therefrom. Fluid flow tube 108 includes flanged portion 110 to aid in accurate positioning of the cup 14 within the canister. Inner tube 26 of cup 14 is coaxially mounted over fluid flow tube 108. Outer wall 20 of the cup is snugly received in the inner diameter of housing 102.

As shown, canister cap 106 includes fluid inlet bore 112 and fluid outlet bore 114, the latter of which communicates with canister axial flow tube 108.

From review of FIGS. 1-5, it is apparent that a container is provided for housing desiccant material therein that is adapted to permit fluid flow therethrough to the surrounding environment. The elongated slot members axially extend around the outer wall of the cup and are disposed in parallel relation to adjacent slot members. The post members are longitudinally disposed around the outer wall of the cup and are located intermediate to and parallel with adjacent slot members.

With further attention direction toward FIG. 1A, it is apparent that the outer wall 20 and post members 98 have a common outside diameter dimension. The flute members 28a (28b not shown in FIG. 1) have an outside diameter dimension that is less than the common outside diameter dimension of the outer wall and post members so that the flute members and slots together define a recessed relief area adapted for channeling fluid flow therein.

The flute member arrays 28a, 28b (FIG. 1) are disposed in parallel axially spaced relation to each other with the lower array of flute members 28b extending from and contiguous to base or bottom 42.

With regard to FIG. 1, a plurality of recessed relief areas are provided with each of the recessed relief areas being defined by the upper array of slots 22a, with its associated bottom array of slots 22b and flute arrays 28a and 28b. The recessed relief areas extend in the longitudinal direction of the cup member and terminate proximate the base.

In operation, and once again turning to FIG. 5 fluid from an air conditioner system enters the assembly through inlet bore 112 and enters the cup 14 through the openings provided in the cap 16. Fluid first flows axially along the cup interior through annular filter medium 48 to contact particulate desiccant 52. The thus dried fluid flow then passes radially outwardly through the filter medium sleeve 50 through one of the slots 22a, 22b. Due to the provision of a recessed or relief area defined by the slots and flutes, the dried and filtered fluid may exit the cup along this recessed, relief area located adjacent to the inside surface of canister housing 102 and proceed downwardly in a longitudinal direction to enter mouth 116 of the axial flow tube 108. At the same time, some of the dried and filtered fluid exits the canister through the apertures 45 for ultimate entry through mouth 116 and exit through outlet bore 114.

It is apparent that the provision of an open surface cap, slots and relief areas in the outside wall of the cup, and apertures in the cup bottom all cooperate to provide enhanced fluid flow through the cup and do not result in an unacceptable pressure drop from canister inlet to canister outlet. It should be noted that the skilled artisan can readily appreciate that the inlet and outlet 112, 114, respectively, in the canister can be reversed and that other fluid inlet and outlet arrangements may be provided.

Figure 6:
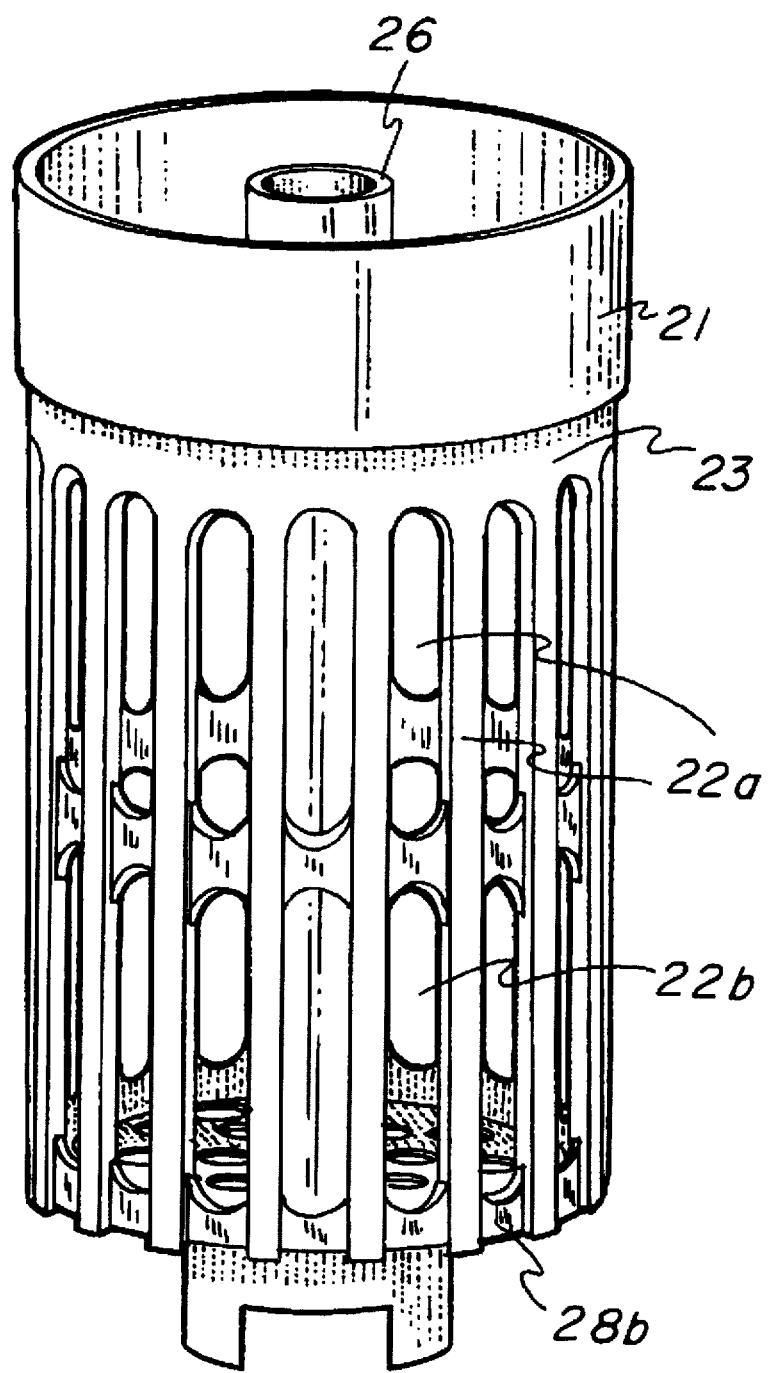
FIG. 6 is a side elevational view of an alternate cup embodiment.

FIG. 6 depicts an alternate cup embodiment 214 wherein the outer wall of the cup is divided into a first transverse section 21 of an o.d. sufficient to provide snug reception of the cup within its associated canister (not shown), and a 2nd transverse section 23 having a reduced o.d. This second section provides a recessed, relief area or channel when placed adjacent the inside wall of the canister. Second transverse section 23 includes a plurality of slots 22a, 22b extending in the axial direction around the periphery of the outer wall of the second section 23 with post members 98 located intermediate neighboring ones of the slots. The o.d. of the post member 98 is the same as the o.d. of second section 23. Due to the location of the slots in the second section 23 of reduced diameter the flutes 28a, 28b need not be of reduced o.d. relative to the o.d. of the posts.

Here again, in the alternate embodiment shown in FIG. 6, the provision of openings in the side, outer wall of the cup allows for greater fluid flow and filter area contact with the fluid.

With regard to other contemplated embodiments, instead of provided two distinct regions having different diameters such as the regions 21, 23 in FIG. 6, a conical taper could be applied to cup with the maximum widthwise or diameter dimension being tailored to snugly nest within the receiver or accumulator canister.

Also, although the cup designs herein shown are generally cylindrical in shape, triangular, square, rectangular, pentagonal, and hexagonal, or other polygonally shaped cups can be provided for wedging or other snug receipt in the canister. In all of these designs, openings should be provided in at least one of the longitudinally extending sidewalls that is spaced from the canister inside surface so that fluid can flow outwardly from the cup into a space or relief area existing between the canister wall and container wall.

Although this invention has been described with respect to certain preferred embodiments, it will be appreciated that a wide variety of equivalents may be substituted for those specific elements shown and described herein, all without departing from the true and scope of the invention as defined in the appended claims.

What is claimed is:

1. A container for housing an adsorbent material therein and adapted to permit fluid flow therethrough, said container comprising a base, and an outer wall connected to said base and extending longitudinally therefrom to define a housing together with said base;

said outer wall comprising a plurality of apertures therein to provide communication between said housing and a surrounding atmosphere, said outer wall further comprising at least one recessed relief area formed therein and in communication with at least one of said apertures, said recessed relief area extending to said base, and defining a fluid flow channel.

2. A container as recited in claim 1 wherein said outer wall is generally cylindrical and wherein a plurality of recessed relief areas are provided, each in communication with at least one of said apertures, each of said plurality of recessed relief areas extending in longitudinal orientation along said cylindrical outer wall and terminating proximate said base.

3. Combination comprising a container as recited in claim 1 and a canister, said canister having a base and outer walls extending upwardly from said base to form a housing, said container mounted snugly within said canister outer walls, said canister further comprising a top portion connected to said canister outer walls along a longitudinal portion thereof opposite from said base, said top portion comprising fluid inlet means and fluid exit means formed therein, said outer wall of said container being nested in contiguous adjoining relation with said container outer wall.

4. A container for housing an adsorbent material therein and adapted to permit fluid flow therethrough to a surrounding environment, said container comprising:

a base;

a generally cylindrically shaped outer wall connected to said base to define a housing; and a plurality of elongated slots extending through said outer wall and providing communication between said housing and said surrounding environment;

wherein said slots are disposed axially around the periphery of said outer wall, each said slot being disposed parallel to a neighboring slot; and said outer wall further comprises flute members extending transversely across said slots.

5. A container for housing an adsorbent material therein and adapted to permit fluid flow therethrough to a surrounding environment, said container comprising:

a base;

a generally cylindrically shaped outer wall connected to said base to define a housing;

a plurality of elongated slots extending through said outer wall and providing communication between said housing and said surrounding environment, wherein said slots are disposed axially around the periphery of said outer wall, each said slot being disposed parallel to a neighboring slot; and a plurality of post members axially disposed around the periphery of said outer wall, each said post member located intermediate a neighboring pair of said slots.

6. A container as recited in claim 4 wherein said outer wall further comprises a first transverse section having a first outer diameter and a second transverse section having a second outer diameter smaller than said first outer diameter; said plurality of elongated apertures being provided in said second transverse section.

7. A container is recited in claim 5 wherein said outer wall further comprises a first transverse section having a first outer member and a second transverse section having a second outer diameter smaller than said first outer diameter, said plurality of elongated slots being provided in said second transverse section.

8. The container as recited in claim 4 wherein said flute members are provided in an upper transverse array and a lower transverse array, said flute member arrays disposed in substantially parallel axially spaced relation to each other, said lower array of flute members extending from and being contiguous to said base.

* * * * *